United States Patent

Smith

Patent Number: 5,797,350
Date of Patent: Aug. 25, 1998

[54] ENCLOSURE FOR SMALL ANIMALS

[76] Inventor: Stephen L. Smith, 7907 Brown Dr., Knoxville, Tenn. 37998

[21] Appl. No.: 838,578

[22] Filed: Apr. 10, 1997

[51] Int. Cl.$^6$ .................................................. A01K 1/00
[52] U.S. Cl. ......................................... 119/475; 119/454
[58] Field of Search .................................. 119/475, 454, 119/462, 416, 61, 452, 480; 206/139, 203, 214, 541, 543, 544, 486; 426/421; D3/201, 202, 224; 43/54.1

[56] References Cited

U.S. PATENT DOCUMENTS

| | | | |
|---|---|---|---|
| 3,160,140 | 12/1964 | Porter | 119/475 |
| 3,347,354 | 10/1967 | West | 206/541 |
| 3,580,219 | 5/1971 | Stebbins | 119/475 X |
| 3,774,576 | 11/1973 | Moore | 179/480 |
| 3,791,346 | 2/1974 | Willinger et al. | 179/456 |
| 4,171,682 | 10/1979 | Merino et al. | 119/475 |
| 4,651,675 | 3/1987 | Collier | 119/416 |
| 4,763,607 | 8/1988 | Tominaga | 119/452 |
| 4,784,084 | 11/1988 | Kohguchi et al. | 119/475 |
| 4,790,260 | 12/1988 | Jones | 119/467 |
| 4,976,219 | 12/1990 | Goguen et al. | 119/496 |
| 5,054,427 | 10/1991 | Hoover | 119/416 X |
| 5,092,269 | 3/1992 | Phillips et al. | 119/452 |
| 5,135,400 | 8/1992 | Ramey | 119/246 |
| 5,174,241 | 12/1992 | Goguen et al. | 119/496 |
| 5,186,122 | 2/1993 | Phillips et al. | 119/474 |
| 5,363,801 | 11/1994 | Watters et al. | 119/452 |
| 5,435,266 | 7/1995 | Carson | 119/475 X |
| 5,474,024 | 12/1995 | Hallock | 119/475 X |
| 5,560,316 | 10/1996 | Lillelund et al. | 119/61 |
| 5,572,953 | 11/1996 | Phelan et al. | 119/496 |
| 5,577,464 | 11/1996 | Wellington et al. | 119/475 |
| 5,595,302 | 1/1997 | Maydell et al. | 206/541 |

Primary Examiner—Michael J. Carone
Assistant Examiner—Yvonne R. Abbott

[57] ABSTRACT

An enclosure for small animals, such as rodents, is described wherein the enclosure is constructed of various component parts. The component parts of the enclosure can be easily replaced when either damaged or destroyed, thus eliminating the need to replace the entire enclosure. The enclosure can also be rapidly assembled and disassembled without the need for any tools or mechanical ability. The enclosure's component parts may be constructed of any suitable thermoplastic material, wherein the thermoplastic material can be either opaque, translucent, or transparent.

3 Claims, 4 Drawing Sheets

ENCLOSURE FOR SMALL ANIMALS

FIELD OF THE INVENTION

The present invention relates generally to enclosures, and more particularly to an enclosure suitable for housing small animals, such as rodents.

BACKGROUND OF THE INVENTION

Small animals, such as rodents (i.e., mice, hamsters, gerbils, guinea pigs), are usually housed in cages or enclosures, which are generally constructed of: (1) metal; (2) plastic or plastic-like materials; (3) glass; or (4) a combination of metal, plastic or plastic-like materials, or glass. In recent years, these enclosures have become much more complex in construction, this complexity being evidenced by the large number of component parts and the high cost of materials involved. Due to this increasing complexity, the retail prices of these enclosures have risen steadily.

When these enclosures are available only in the fully or partially assembled state, they are very difficult to completely disassemble for cleaning or maintenance purposes. Conversely, when these enclosures are available only in the fully disassembled state, it is often necessary for the purchaser to use various tools calling for a certain level of mechanical ability in order to properly assemble the enclosure. Additionally, when a portion or a particular component of these enclosures is either damaged or destroyed (as is typically the case with gnawing rodents), it is usually necessary to discard the entire enclosure and purchase a new enclosure, thus increasing the equipment costs of laboratories, breeders, and pet owners.

Finally, some of these enclosures are constructed of materials which make viewing the entire interior area of the enclosure difficult, if not impossible to do, and also make cleaning and disinfecting the entire interior area difficult or impossible to do.

Therefore, what is needed is an enclosure for housing small animals which is: (1) simple to assemble and disassemble; (2) is constructed of a small number of inexpensive component parts which are easily replaced when necessary; (3) allows for easy viewing of the entire interior area of the enclosure; and (4) allows for ease in cleaning and disinfecting.

OBJECTS OF THE INVETION

Accordingly, it is an object of the present invention to provide a new and improved enclosure.

It is another object of the present invention to provide a new and improved enclosure for small animals.

It is another object of the present invention to provide a new and improved enclosure for rodents.

It is another object of the present invention to provide a new and improved enclosure, wherein the enclosure is constructed of component parts.

It is another object of the present invention to provide a new and improved enclosure for small animals, wherein the enclosure is constructed of component parts.

It is another object of the present invention to provide a new and improved enclosure for rodents, wherein the enclosure is constructed of component parts.

It is another object of the present invention to provide a new and improved enclosure, wherein the enclosure is constructed of component parts which are comprised of a thermoplastic material.

It is another object of the present invention to provide a new and improved enclosure for small animals, wherein the enclosure is constructed of component parts which are comprised of a thermoplastic material.

It is another object of the present invention to provide a new and improved enclosure for rodents, wherein the enclosure is constructed of component parts which are comprised of a thermoplastic material.

It is another object of the present invention to provide a new and improved enclosure, wherein the enclosure is constructed of component parts which are removably fastened to one another.

It is another object of the present invention to provide a new and improved enclosure for small animals, wherein the enclosure is constructed of component parts which are removably fastened to one another.

It is another object of the present invention to provide a new and improved enclosure for rodents, wherein the enclosure is constructed of component parts which are removably fastened to one another.

It is another object of the present invention to provide a new and improved enclosure, wherein the enclosure is constructed of component parts which are comprised of an opaque thermoplastic material.

It is another object of the present invention to provide a new and improved enclosure for small animals, wherein the enclosure is constructed of component parts which are comprised of an opaque thermoplastic material.

It is another object of the present invention to provide a new and improved enclosure for rodents, wherein the enclosure is constructed of component parts which are comprised of an opaque thermoplastic material.

It is another object of the present invention to provide a new and improved enclosure, wherein the enclosure is constructed of component parts which are comprised of a translucent thermoplastic material.

It is another object of the present invention to provide a new and improved enclosure for small animals, wherein the enclosure is constructed of component parts which are comprised of a translucent thermoplastic material.

It is another object of the present invention to provide a new and improved enclosure for rodents, wherein the enclosure is constructed of component parts which are comprised of a translucent thermoplastic material.

It is another object of the present invention to provide a new and improved enclosure, wherein the enclosure is constructed of component parts which are comprised of a transparent thermoplastic material.

It is another object of the present invention to provide a new and improved enclosure for small animals, wherein the enclosure is constructed of component parts which are comprised of a transparent thermoplastic material.

It is another object of the present invention to provide a new and improved enclosure for rodents, wherein the enclosure is constructed of component parts which are comprised of a transparent thermoplastic material.

Further and other objects of the present invention will become apparent from the description contained herein.

SUMMARY OF THE INVENTION

In accordance with one aspect of the present invention, the foregoing and other objects are achieved by:

a base unit, the base unit being comprised of a base and a first and second pair of opposed upwardly depending walls, (the first and second pair of opposed upwardly depending walls being fastened to the base), the base having a plurality of receiving means; the first and second pair of opposed upwardly depending walls having a plurality of receiving means, the base being comprised of a thermoplastic material, the first and second pair of opposed upwardly depending walls being comprised of a thermoplastic material; and a lid, the lid being removably fastened to the first and second pair of opposed upwardly depending walls, the lid being comprised of a thermoplastic material.

DETAILED DESCRIPTION OF PREFERRED EMBODIMENT

Figure 1:
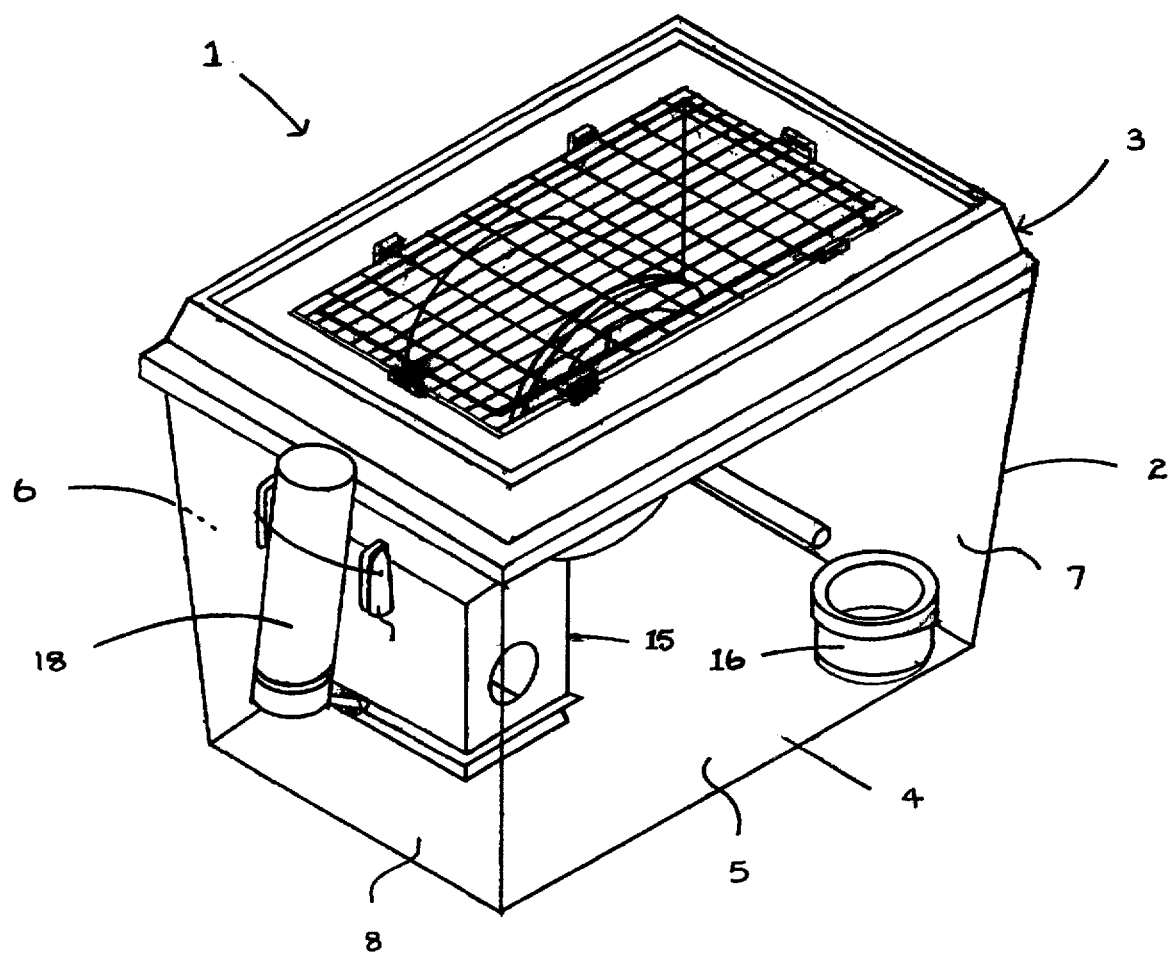
FIG. 1 illustrates a perspective view of a fully assembled enclosure with various optional components, in accordance with one aspect of the present invention.

With reference to FIG. 1, there is generally illustrated an enclosure 1 for housing small animals in accordance with one aspect of the present invention. It is to be noted that the enclosure 1 as depicted is for illustrative purposes only, and that many different shapes and configurations of the enclosure 1 are envisioned. The enclosure 1 is shown in its fully assembled state with a number of optional components attached. The type of small animals envisioned for the enclosure 1 generally belong to the category of animals known as rodents. Rodents include mice, hamsters, gerbils, guinea pigs, as well as a number of other similar creatures.

Although the enclosure 1 is depicted as generally rectangular in shape, it should be appreciated that other shapes are envisioned (i.e., squares, oblongs, ovals, circles). Additionally, the enclosure 1 can be constructed on any scale depending on the size of the animal to be housed. The enclosure 1 consists basically of a base unit 2 which actually houses the animal, and a lid 3 which fits over the base unit 2. Both the lid 3 and base unit 2 can be constructed of any suitable material, however it is preferable to use a thermoplastic material (i.e., polypropylene or polyethylene) due to the light weight, relative low cost, and ease of molding associated with these materials. These thermoplastic materials can be either opaque, translucent, or transparent. Additionally, these thermoplastic materials can be colored to vary the appearance of the enclosure and its components.

The base unit 2 consists mainly of a base 4 which is comprised of a substantially flat and level member, a pair of opposed upwardly depending side walls 5, 6 comprised of substantially flat and level members, and a pair of opposed upwardly depending end walls 7, 8 comprised of substantially flat and level members. The side walls 5, 6 and end walls 7, 8 are permanently fastened or attached to the base 4. It is envisioned that the base unit 2 will be formed as a single piece of thermoplastic material. However, the base unit 2 may be fashioned from component parts which are then permanently fastened to one another by gluing, hot melting, or any other suitable means. Also illustrated is an optional breeding enclosure 15, an optional food dish 16, and an optional water bottle 18. The water bottle 18 may be held in place by securing means 21.

Figure 2:
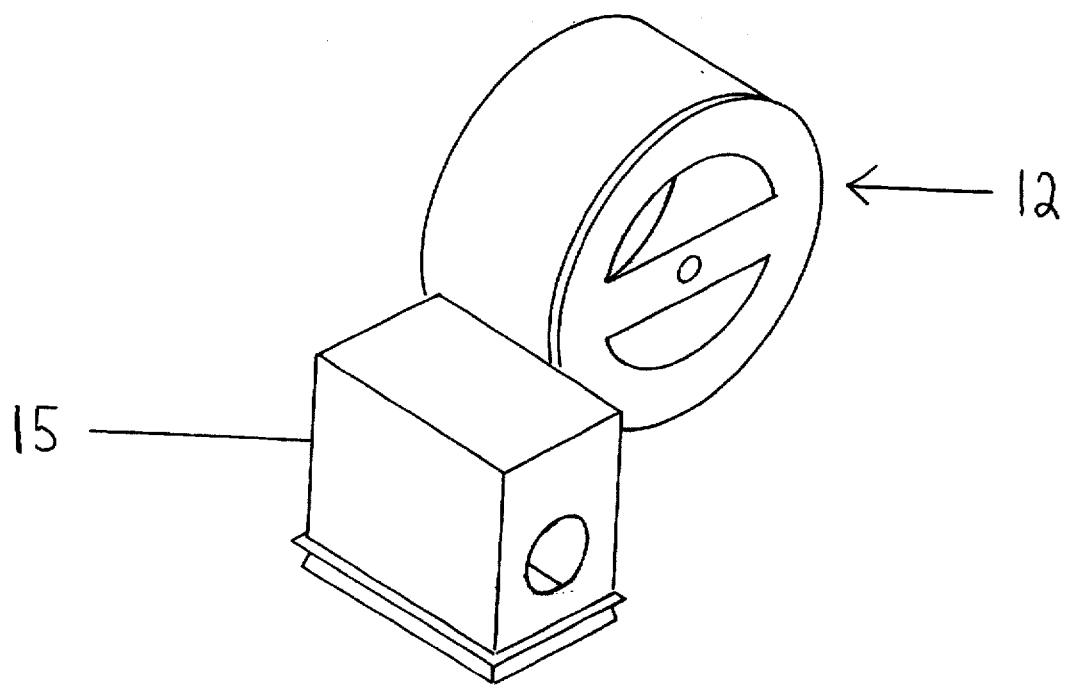
FIG. 2 illustrates an exploded view of a base unit of an enclosure, in accordance with one aspect of the present invention.
Figure 2:
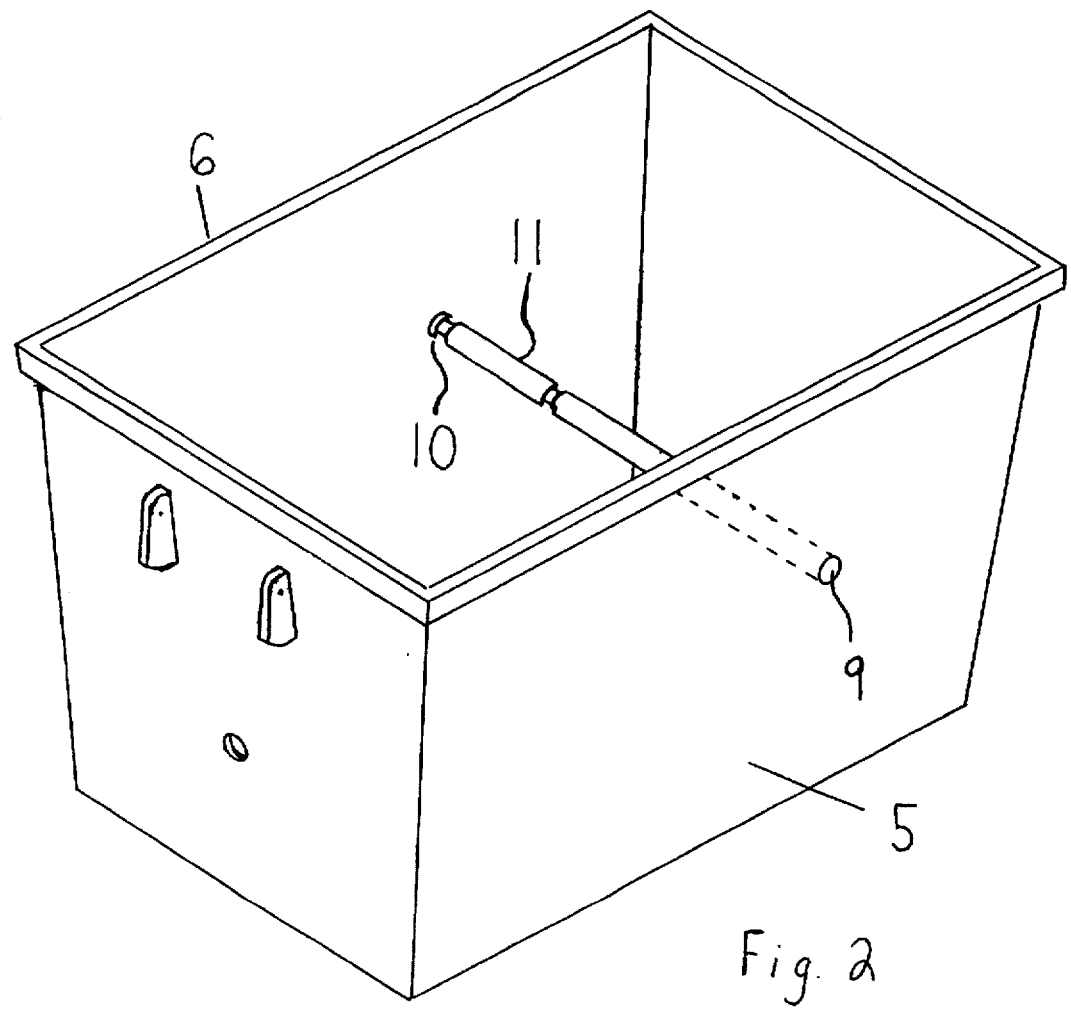

With reference to FIG. 2, the side walls 5, 6 have a plurality of receiving means 9, 10 for receiving a structure such as rod or spindle 11 for supporting an exercise wheel 12 or other suitable structures.

Figure 3:
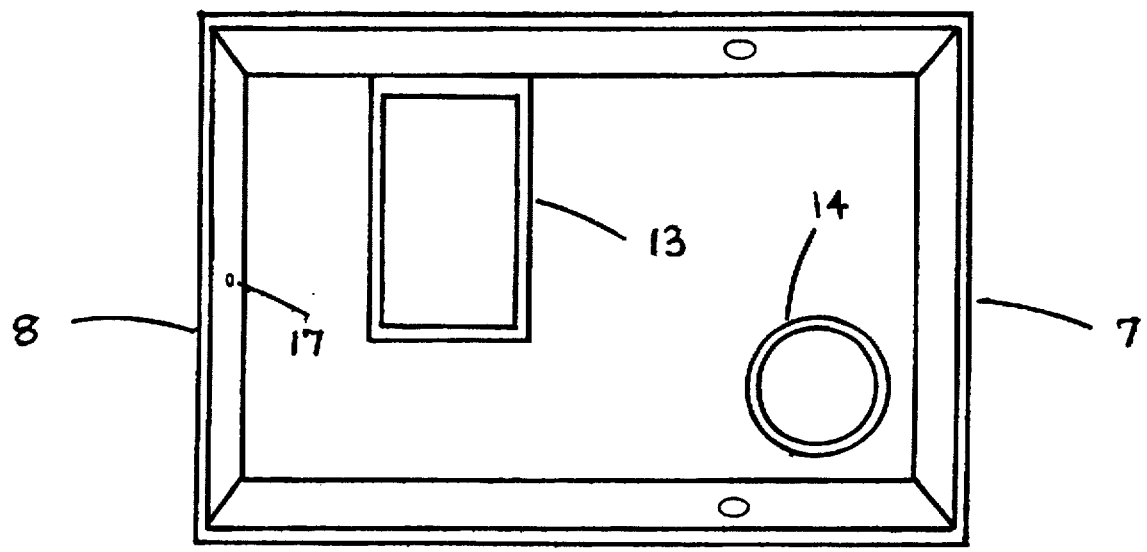
FIG. 3 illustrates a top view of a base unit of an enclosure, in accordance with one aspect of the present invention.

With reference to FIG. 3, the top surface of the base 4 has a plurality of receiving means 13, 14 for receiving a structure such as a breeding enclosure 15 or a food dish 16. The end walls 7, 8 have a plurality of receiving means 17 for receiving a structure such as a water bottle 18. The breeding enclosure 15 may be constructed of a thermoplastic material that is either opaque or darkly colored in order to give the female animal additional privacy.

As previously mentioned, the receiving means 9, 10 located on the side walls 5, 6 can be used to receive a rod or spindle 11 through which an exercise wheel 12 can be mounted. Although the receiving means 9, 10 on each of the side walls 5, 6 are located at identically opposing locations and heights, these locations can be modified to provide for a transverse configuration, if desired. The receiving means 9, 10 may be formed in a manner of ways, including gluing, injection molding, or hot melting techniques. The receiving means 9, 10 can consist of a U-shaped bracket into which the rod or spindle 11 sits or rests. Additionally, the receiving means 9, 10 can consist of a circular raised lip into which the rod or spindle 11 is forced or snap-fitted. Finally, the receiving means 9, 10 can simply consist of a pair of apertures through which the rod or spindle 11 is received. It should be appreciated that a number of different options are available as to the form and appearance of the receiving means 9, 10. The advantage of the receiving means 9, 10 is that various apparatuses can be easily substituted for the exercise wheel 12. Additionally, if the rod or spindle 11 or the exercise wheel 12 is either damaged or destroyed, they can be easily replaced without having to purchase an entire new enclosure 1.

As previously mentioned, the receiving means 13, 14 located on the top surface of the base 4 can be used to receive a breeding enclosure 15, a food dish 16, or any number of suitable structures. Like the receiving means 9, 10 of the side walls 5, 6, the receiving means 13, 14 of the base 4 can be formed in a manner of ways, including gluing, injection molding, or hot melting techniques. The receiving means 13, 14 of the base 4 can consist of a U-shaped raised groove or bracket into which a structure can be slid and thus snugly received. Additionally, the receiving means 13, 14 of the base 4 can consist or a raised lip or a plurality of snaps into which a structure can be forced or snap-fitted. The advantage of the receiving means 13, 14 of the base 4 is that various structures can be easily substituted for the breeding enclosure 15 or the food dish 16. Additionally, if the breeding enclosure 15 or the food dish 16 is either damaged or destroyed, they can be easily replaced without having to purchase an entire new enclosure 1. This ease of replacement also aids in the ease of thoroughly cleaning the enclosure 1.

Figure 4:
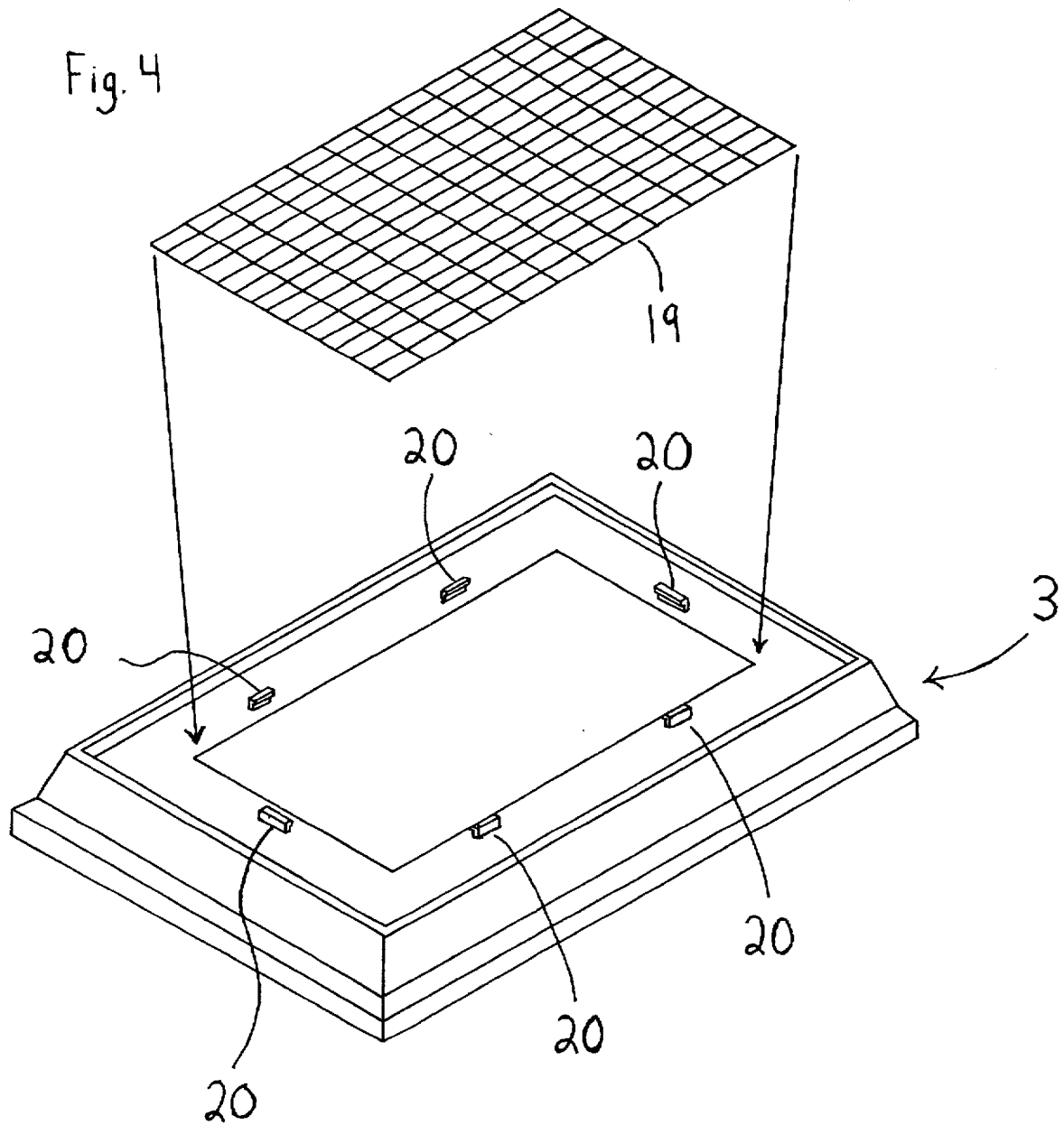
FIG. 4 illustrates an exploded view of a lid of an enclosure, in accordance with one aspect of the present invention.

With respect to FIG. 4, the bottom portion of the lid 3 is removably fastened to the top portion of the base unit. It should be noted that the lid 3 can be configured in any number of shapes, provided that it can securely fastened to the base unit 2 to prevent the animal from escaping. Therefore, the lid 3 should be snugly received by the base unit 2 in order to prevent the escape of the animal from the base unit 3. The fastening can be accomplished in a number of suitable ways, i.e., recessed peripheral groove, snap fit, clips, clamps, screws, or locks. The main consideration with respect to fastening the lid 3 to the base unit 2 is to ensure that the animal can not force the lid 3 off the base unit 2 and escape from the base unit 2. Instead of the lid 2 being constructed of a solid piece of material, it can also be equipped with a grill or screen unit 19 which can be disposed in the central area of the lid 3. The grill or screen unit 19 can be constructed of either metal or a thermoplastic material. The grill or screen unit 19 allows the viewing of the entire interior area of the base unit 2 while looking down upon the enclosure 1. The grill or screen unit 19 may be secured to the lid 3 by a plurality of securing means 20. The securing means 20 allow the grill or screen unit 19 to be removably fastened to the lid 3 by any number of suitable ways, i.e., snap fit, clips, clamps, screws, or locks. It is preferable for the grill or screen unit 19 to be removably fastened to the lid 3 so that the grill or screen unit 19 can be replaced if it is either damaged or destroyed.

While there has been shown and described what are at present considered the preferred embodiments of the invention, it will be obvious to those skilled in the art that various changes and modifications can be made therein without departing from the scope of the invention defined by the appended claims.

I claim:

1. An enclosure, comprising:

a base unit, said base unit being comprised of a base and a first and second pair of opposed upwardly depending walls, (said first and second pair of opposed upwardly depending walls being fastened to said base,) said base having a plurality of receiving means, wherein said base comprises a structure being removably fastened to at least one of said receiving means; said first and second pair of opposed upwardly depending walls having a plurality of receiving means, said base being comprised of a thermoplastic material, said first and second pair of opposed upwardly depending walls being comprised of a thermoplastic material; and a lid being removably fastened to said first and second pair of opposed upwardly depending walls, said lid being comprised of a thermoplastic material.

2. An enclosure in accordance with claim 1 wherein said structure is a food dish.

3. An enclosure in accordance with claim 1 wherein said structure is a breeding enclosure.

* * * * *